United States Patent [19]

Anada

[11] Patent Number: 5,777,019

[45] Date of Patent: Jul. 7, 1998

[54] POLYACETAL RESIN COMPOSITION

[75] Inventor: Sachio Anada, Shizuoka, Japan

[73] Assignee: Polyplastics Co., Ltd., Japan

[21] Appl. No.: 721,656

[22] Filed: Sep. 27, 1996

[30] Foreign Application Priority Data

Sep. 29, 1995 [JP] Japan ............................ 7-252534
Dec. 27, 1995 [JP] Japan ............................ 7-340401

[51] Int. Cl.⁶ .................................................. C08K 3/00
[52] U.S. Cl. ........................... 524/404; 524/405; 524/494
[58] Field of Search ............................. 524/404, 405, 524/494

[56] References Cited

U.S. PATENT DOCUMENTS

| | | | |
|---|---|---|---|
| 4,652,594 | 3/1987 | Auerbach | 523/208 |
| 5,137,958 | 8/1992 | Matsunami | 524/405 |
| 5,354,798 | 10/1994 | Tsukahara | 524/413 |

FOREIGN PATENT DOCUMENTS

| | | |
|---|---|---|
| 0 450 630 | 10/1991 | European Pat. Off. |
| 1480929 | 5/1967 | France |
| 56-041 245 | 4/1981 | Japan |
| 62-091 551 | 4/1987 | Japan |
| WO 89/09805 | 10/1989 | WIPO |

*Primary Examiner*—Edward J. Cain
*Attorney, Agent, or Firm*—Nixon & Vanderhye P.C.

[57] ABSTRACT

The present invention provides a polyacetal resin composition which provides the molded articles with an excellent mechanical strength. The polyacetal resin composition comprises:

(A) 100 parts by weight of a polyacetal resin blended with
(B) 3 through 200 parts by weight of a glass type inorganic filler and
(C) 0.001 through 3.0 parts by weight of a boric acid compound.

5 Claims, No Drawings

POLYACETAL RESIN COMPOSITION

FIELD OF THE INVENTION

The present invention relates to an improved polyacetal resin composition, more specifically to a polyacetal resin composition which provides a molded article with an excellent mechanical strength, comprising a polyacetal resin blended with a glass type inorganic filler and a boric acid compound.

DESCRIPTION OF THE RELATED ART

It has so far been known that polyacetal resins can be strengthened by glass type inorganic fillers. Since the glass type inorganic fillers are chemically inert, merely melting and kneading a polyacetal resin with a glass type inorganic filler such as glass beads does not reveal a reinforcing effect, and on the contrary, the mechanical strength is reduced more than those of non-reinforced polyacetal resins in some cases.

In order to improve this matter, it is proposed that glass type inorganic fillers subjected to a surface treatment by epoxy compounds, silane compounds or titanate compounds are used.

However, when these processes are industrially carried out, the mechanical strengths are not so improved and therefore can not yet be satisfactory.

SUMMARY OF THE INVENTION

In view of such problems, intensive investigations made by the present inventors in order to obtain a reinforced polyacetal resin composition having excellent mechanical characteristics have resulted in realizing that the preceding problems can notably be improved by melting and kneading a small amount of a boric acid compound together with a polyacetal resin and a glass type inorganic filler to prepare a composition, and thus completing the present invention.

That is, the present invention relates to a polyacetal resin composition comprising:

(A) 100 parts by weight of a polyacetal resin blended with
(B) 3 through 200 parts by weight of a glass type inorganic filler and
(C) 0.001 through 3.0 parts by weight of a boric acid compound.

In other words, the composition comprises (A), (B),and (C), being well kneaded.

DETAILED DESCRIPTION OF THE INVENTION

The structural components of the present invention will be explained below.

The polyacetal resin (A) used in the present invention is a polymer compound comprising a principal structural unit of an oxymethylene group (—$CH_2O$—) and may be any one of polyoxymethylene homopolymers, or copolymers, terpolymers or block polymers comprising a principal repetitive unit of an oxymethylene group and containing a small amount of a different structural unit other than this, for example, a comonomer unit such as ethylene oxide, 1,3-dioxolane, and 1,4-butanediol. Further, the polyacetal resin used in the present invention not only may comprise a linear molecule but also may have a cross-linked structure or may be a publicly known, modified polyoxymethylene into which other organic groups are introduced. A polymerization degree thereof is not specifically restricted as long as the good molding processability (for example, a melt flow rate (MFR) with applied load of 2160 g at 190° C. is 1.0 through 100 g/10 minutes) is provided.

Next, the glass type inorganic filler of the component (B) used in the present invention, that is, an inorganic filler of glass, can be used as, fibrous (glass fiber), powdery (milled fiber), and tabular (glass flake) fillers or hollow matters (glass balloon), or mixtures thereof according to the purposes.

Non-treated fillers can be used as these glass type inorganic fillers, but inorganic fillers subjected to treatment with surface-treating agents such as titanate or silane coupling agents are preferably used. The titanate surface-treating agents include, for example, titanium-i-propoxyoctylene glycolate, tetra-n-butoxytitanium, and tetrakis(2-ethylhexoxy)titanium.

The silane coupling agents include, for example, vinylalkoxysilane, epoxyalkoxysilane, aminoalkoxysilane, mercaptoalkoxysilane, and allylalkoxysilane.

Vinylalkoxysilane includes, for example, vinyltriethoxysilane, vinyltrimethoxysilane, and vinyltris(β-methoxyethoxy)silane.

Epoxyalkoxysilane includes, for example, γ-glycideoxypropyltrimethoxysilane, β-(3,4-epoxycyclohexyl)ethyltrimethoxysilane, and γ-glycideoxypropyltriethoxysilane.

Aminoalkoxysilane includes, for example, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, and N-phenyl-γ-aminopropyltrimethoxysilane.

Mercaptoalkoxysilane includes, for example, γ-mercaptopropyltrimethoxysilane and γ-mercaptopropyltriethoxysilane.

Allyalkoxysilane includes, for example, γ-diallylaminopropyltrimethoxysilane, γ-allylaminopropyltrimethoxysilane and γ-allylthiopropyltrimethoxysilane.

Any type of the surface treating agents can be used to obtain the intended effects of the present invention, but in order to achieve the object of the present invention, aminoalkoxysilane is a particularly preferred surface treating agent.

A used amount of the surface treating agent is 0.01 through 20 parts by weight, preferably 0.05 through 10 parts by weight, and particularly preferably 0.05 through 5 parts by weight based on 100 parts by weight of the inorganic filler.

A blended amount of the inorganic filler as the component (B) is 3 through 200 parts by weight, preferably 5 through 150 parts by weight, and particularly preferably 5 to 100, 10 to 70 and 10 through 100 parts by weight. The blended amount of less than 3 parts by weight insufficiently improves the mechanical properties, and the amount exceeding 200 parts by weight makes molding difficult.

The boric acid compound of the component (C) used in the present invention includes orthoboric acid, metaboric acid, tetraboric acid, and diboron trioxide. Commercially available products can be used as well.

A blended amount of the boric acid compound as the component (C) is 0.001 through 3 parts by weight, preferably 0.005 through 1 part by weight, and particularly preferably 0.005 to 0.05, 0.001 to 0.1 and 0.01 through 0.5 part by weight. The blend amount of less than 0.001 part by weight does not provide the desired effects, and the amount exceeding 3 parts by weight causes a problem on a heat stability.

Further, various publicly known stabilizers can be added to the composition of the present invention to reinforce the stability. Various publicly known additives can further be blended in order to improve the physical properties according to the intended uses. Examples of the additives include various colorants, lubricants, releasing agents, nuclear agents, antistatic agents, other surfactants, different kinds of polymers, organic improving agents, and fillers other than those used in the present invention.

The composition of the present invention can readily be prepared by publicly known processes which are usually used as processes for preparing conventional resin compositions. Such processes include, for example, a process in which after blending the respective components, the composition is knead-extruded by means of a single shaft or dual shaft extruder to prepare pellets, and then the pellets are molded, and a process in which pellets (master batch) having different compositions are once prepared, and specified amounts of the pellets are blended (diluted) and molded to obtain a molded article having an intended composition.

In preparing the composition of the present invention, it is a preferred way for improving a dispersibility of the additives to pulverize part or entirety of the polyacetal resin which is a base component, blend this with the other components and then extrude it.

The present invention can provide the polyacetal resin composition having excellent mechanical properties.

EXAMPLES

The present invention will be explained below with reference to examples but the present invention shall not be restricted to these examples.

Examples 1 to 19 and Comparative Examples 1 to 10

Various glass type inorganic fillers and boric acids shown in Tables 1 and 2 were blended with 100 parts by weight of a polyacetal resin (trade name Duracon M270J manufactured by Polyplastics Co., Ltd.) in the amounts shown in Tables 1 and 2, and the blended components were molten and kneaded by means of an extruder at a cylinder temperature of 200° C. to prepare the pelletized compositions. Then, test pieces were molded from these pelletized compositions by means of an injection molding machine and measured for the physical properties shown below. The results thereof are shown in Tables 1 and 2.

For the sake of comparison, compositions in which boric acids were not added to the respective glass type inorganic fillers were prepared in the same manner to evaluate them. The results thereof are shown in Table 3.

The measuring and evaluating methods are shown below Tensile strength and elongation/flexural strength A test piece was left for standing for 48 hours in the conditions of a temperature of 23° C. and a humidity of 50 % and measured according to ASTM-D638 (tensile) and ASTM-D790 (flexural).

TABLE 1

| Composition | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 1 |
| (A) | Polyacetal resin | 100 | 100 | 100 | 100 | 100 | 100 | 100 | 100 | 100 | 100 | 100 | 10 |
| (B) | Glass beads | B-1 | B-2 | B-2 | B-2 | B-2 | B-2 | B-2 | B-2 | B-2 | B-4 | B-5 | B- |
| | | 35 | 35 | 35 | 35 | 35 | 10 | 35 | 70 | 35 | 35 | 35 | 3 |
| | Glass fiber | | | | | | | | | | | | |
| | Glass flake | | | | | | | | | | | | |
| (C) | Boric acid compound | C-1 | C-1 | C-1 | C-1 | C-1 | C-1 | C-2 | C-1 | C-1 | C-1 | C-1 | C- |
| | | 0.03 | 0.01 | 0.005 | 0.03 | 0.05 | 0.03 | 0.03 | 0.03 | 0.03 | 0.03 | 0.03 | 0.0 |
| Evaluation | | | | | | | | | | | | | |
| Tensile strength (kg/cm²) | | 558 | 570 | 514 | 630 | 640 | 638 | 637 | 522 | 584 | 595 | 588 | 60 |
| Tensile elongation (%) | | 19.3 | 22.0 | 21.3 | 25.3 | 26.3 | 25.5 | 25.8 | 8.3 | 20.9 | 21.0 | 21.0 | 20 |
| Flexural strength (kg/cm²) | | 1140 | 1187 | 893 | 1280 | 1316 | 917 | 1310 | 751 | 1210 | 1244 | 1230 | 118 |

TABLE 2

| Composition | | Examples | | | | | | |
|---|---|---|---|---|---|---|---|---|
| | | 13 | 14 | 15 | 16 | 17 | 18 | 1 |
| (A) | Polyacetal resin | 100 | 100 | 100 | 100 | 100 | 100 | 10 |
| (B) | Glass beads | | | | | | | |
| | Glass fiber | B-7 | B-7 | B-7 | B-7 | B-7 | B-8 | |
| | | 35 | 35 | 35 | 10 | 35 | 35 | |
| | Glass flake | | | | | | | B |
| (C) | Boric acid compound | C-1 | C-1 | C-1 | C-1 | C-2 | C-1 | C |
| | | 0.03 | 0.005 | 0.01 | 0.03 | 0.03 | 0.03 | 0.0 |
| Evaluation | | | | | | | | |
| Tensile strength (kg/cm²) | | 1500 | 1290 | 1320 | 1045 | 1572 | 1370 | 7 |
| Tensile elongation (%) | | 2.5 | 2.2 | 2.3 | 3.8 | 2.8 | 2.2 | 7 |
| Flexural strength (kg/cm²) | | 2270 | 1954 | 2001 | 1131 | 2315 | 1584 | 13 |

TABLE 3

| Composition | Comparative Examples | | | | | | | | | |
|---|---|---|---|---|---|---|---|---|---|---|
| | 1 | 2 | 3 | 4 | 5 | 6 | 7 | 8 | 9 | 10 |
| (A) Polyacetal resin | 100 | 100 | 100 | 100 | 100 | 100 | 100 | 100 | 100 | 100 |
| (B) Glass beads | | B-1 35 | B-2 35 | B-2 10 | B-2 70 | B-6 35 | | | | |
| Glass fiber | | | | | | | B-7 35 | B-7 10 | B-8 35 | |
| Glass flake | | | | | | | | | | B-9 35 |
| (C) Boric acid compound | | | | | | | | | | |
| Evaluation | | | | | | | | | | |
| Tensile strength (kg/cm$^2$) | 640 | 445 | 462 | 480 | 391 | 451 | 1210 | 845 | 1220 | 631 |
| Tensile elongation (%) | 60.0 | 13.9 | 14.8 | 24.7 | 7.3 | 14.3 | 2.2 | 3.1 | 2.1 | 7.1 |
| Flexural strength (kg/cm$^2$) | 920 | 759 | 772 | 680 | 573 | 763 | 1850 | 1023 | 1790 | 1120 |

*B-1: Glass beads (no surface treating agent used)

B-2: Glass beads subjected to a surface treatment by γ-aminopropyltriethoxysilane B-3: Glass beads subjected to a surface treatment by vinyltriethoxysilane B-4: Glass beads subjected to a surface treatment by γ-glycideoxypropyltriethoxysilane B-5: Glass beads subjected to a surface treatment by mercaptopropyltrimethoxysilane B-6: Glass beads subjected to a surface treatment by titanium-i-propoxyoctylene glycolate B-7: Glass fiber subjected to a surface treatment by γ-aminopropyltriethoxysilane B-8: Glass fiber subjected to a surface treatment by titanium-i-propoxyoctylene glycolate B-9: Glass flake subjected to a surface treatment by γ-aminopropyltriethoxysilane C-1: Orthoboric acid C-2: Tetraboric acid

What is claimed is:

1. A polyacetal resin composition consisting essentially of:
   (A) 100 parts by weight of a polyacetal resin,
   (B) between 3 to 200 parts by weight of inorganic glass filler, and
   (C) between 0.001 to 3.0 parts by weight of a boric acid compound.

2. The polyacetal resin composition as claimed in claim 1, wherein the component (B) is glass fiber.

3. The polyacetal resin composition as claimed in claim 1, wherein the component (B) is an inorganic filler selected from glass beads, milled glass fiber and glass flake.

4. The polyacetal resin composition as claimed in claim 1, wherein component (B) includes an aminoalkoxysilane surface treatment.

5. The polyacetal resin composition as claimed in claim 1, wherein the boric acid compound (C) is at least one selected from orthoboric acid, metaboric acid, tetraboric acid and diboron trioxide.

* * * * *